United States Patent [19]

Itoh

[11] Patent Number: 4,585,206

[45] Date of Patent: Apr. 29, 1986

[54] PROPORTIONAL FLOW CONTROL VALVE

[75] Inventor: Noboru Itoh, Kobe, Japan

[73] Assignee: Kawasaki Jukogyo Kabushiki Kaisha, Japan

[21] Appl. No.: 790,609

[22] Filed: Oct. 23, 1985

[30] Foreign Application Priority Data

Oct. 29, 1984 [JP] Japan .................................. 59-226982

[51] Int. Cl.$^4$ ....................... F16K 31/40; F16K 31/42; F16K 31/128
[52] U.S. Cl. ............................ 251/30.02; 251/129.08; 137/614.11
[58] Field of Search ............... 251/30.02, 30.01, 30.03, 251/30.04, 33, 129.08, 36, 37, 41, 43, 44; 137/614.11

[56] References Cited

U.S. PATENT DOCUMENTS

| | | | |
|---|---|---|---|
| 2,755,058 | 7/1956 | Margrave | 251/30.02 X |
| 3,250,293 | 5/1966 | Adams et al. | 251/129.08 X |
| 3,667,722 | 6/1972 | Katz et al. | 251/129.08 X |
| 4,478,245 | 11/1984 | Bender | 251/30.01 X |
| 4,553,732 | 11/1985 | Brundage et al. | 251/43 X |

FOREIGN PATENT DOCUMENTS

| | | | |
|---|---|---|---|
| 41247 | 12/1981 | European Pat. Off. | 251/30.02 |
| 112470 | 8/1980 | Japan | 251/129.08 |
| 2065929 | 8/1981 | United Kingdom | 251/30.01 |

Primary Examiner—Martin P. Schwadron
Assistant Examiner—John S. Starsiak, Jr.

[57] ABSTRACT

A proportional flow control valve is disclosed in which an opening of a variable orifice formed by a proportion solenoid and a pilot spool is varied to vary a flow rate of fluid in a restriction passage by-passing a plunger of a main control portion connected to the variable orifice and hence a pressure difference across the plunger to thereby vary a position of the plunger. The pilot spool is inserted into a sleeve and has one end formed with a poppet portion which is able, with an aid of a spring, to contact with a valve seat formed in one end of the sleeve. The pilot spool is by-passed by a restriction passage and the poppet portion becomes in intimate contact with the valve seat when a force of the proportion solenoid in zero and the variable orifice is opened and connected through the poppet portion and the restriction passage to a drain when the pilot spool is moved by the force of the proportion solenoid.

1 Claim, 3 Drawing Figures

PROPORTIONAL FLOW CONTROL VALVE

FIELD OF THE INVENTION AND RELATED ART STATEMENT

The present invention relates to an electromagnetic proportionel flow control valve by which a flow rate is substantially in proportion to a valve of an input current supplied thereto.

FIG. 3 shows an example of a conventional electromagnetic proportional flow control valve of the pressure feedback type, schematically. The electromagnetic proportional flow control valve shown in FIG. 3 is composed of a pilot portion 52 having a proportional solenoid 51 and a main flow rate control portion 53. The main flow rate control portion 53 is composed of a valve body 56 formed with an inlet port 54, an outlet port 55 communicated with the inlet port 54 through a cavity providing a valve seat 59, in which a plunger 57 is disposed. The plunger 57 is biased by a spring 58 toward the valve seat 59 to reduce or block the communication between the inlet port 54 and the outlet port 55. The pilot portion 52 is composed of a spring chamber 60 housing a spring 61 and a proportion solenoid 51 to which a pilot spool 62 is urged by the spring 61. An annular groove 66 forming, in cooperation with a land 65 of the pilot spool 62, a variable orifice as a flow rate control portion 70 and the inlet passage 54 are communicated with each other by a pilot passage 64 in which a fixed restriction 63 is disposed. An upstream side of the fixed restirction 63 is communicated with the spring chamber 60 by a through-hole 69 and the annular groove 66 is communicated through a feedback passage 67 with a fluid chamber (not numbered) of the proportion solenoid 51 and a spring chamber 68 of the plunger 57.

In operation, when the solenoid provides no force, the flow rate control portion 70 of the pilot spool 62 is in a closed state and, therefore, there is no pressure difference across the fixed restriction 63. Consequently, there is substantially no pressure difference across the pilot spool 62 as well as the plunger 57. Therefore, the communication between the inlet port 54 and the outlet port 55 is blocked by the plunger 57 with the aid of the spring 58. When a certain electric current is supplied to the solenoid 51 and, in response thereto, the solenoid 51 produces a certain force which is large enough to urge the pilot spool 62 against the force of the spring 61, the flow rate control portion 70 is opened to allow fluid in the pilot passage 64 to flow through the flow rate control portion 70, the chamber 71 and a drain passage 72 to a drain tank 73, resulting in a pressure difference across the fixed restriction 63. The pressure difference is transmitted through the pilot spool 62 to hold an aperture of the flow rate control portion 70 against the solenoid force to a value corresponding to the solenoid force and to move the plunger 57 up to a position in which the urging force of the plunger due to the pressure difference and the force of the spring 58 are balanced to thereby provide a communication between the ports 54 and 55.

In the conventional apparatus mentioned as above, however, the pilot operation portion 52 has to be provided with, in addition to the pilot passage 64, the feedback passage 67 for introducing the pilot pressure to the fluid chamber of the proportion solenoid and the spring chamber 68 of the plunger 57. Therefore, the structure itself is complicated. Further, since the pilot pressure is introduced into the proportion solenoid 51, the latter must be pressure durable and water-tight, causing the valve to be bulky and expensive. In addition, since there is a small overlapping area of the flow rate control portion of the pilot spool, in a neutral portion, there may be a relatively large fluid leakage therein. Due to the latter, a load supporting function of the apparatus is degraded when it is applied to a circuit system for supporting a load during the neutral position thereof, particularly to a circuit for lowering a load of the load lifting apparatus.

OBJECT AND SUMMARY OF THE INVENTION

The present invention is intended to overcome those difficulties inherent to the conventional flow control valve of electromagnetic type.

According to the present invention, a pilot spool is slidably fitted in a sleeve which is fixedly secured to a valve bore. An end portion of the pilot spool on which a spring force is exerted is provided with a poppet portion which is able to contact with a valve seat formed on one end of the sleeve and opposite sides of the spool is communicated by a restriction passage with each other. A drain passage is provided between a chamber housing a push rod and a drain receiving portion so that, when there is no pushing force of a proportion solenoid, the poppet portion becomes in an intimate contact with the valve seat and, when the pilot spool is pushed by the push rod, a pilot passage is connected through a variable orifice and the poppet portion to a spring chamber. The pilot spool is provided with a long land between an annular groove of the pilot spool to which the pilot passage is connected and the chamber connected to the drain passage. The land is in contact with an inner surface of the sleeve.

In operation, when there is no input current supplied to the proportion solenoid, the poppet portion of the pilot spool is in contact with the valve seat to block a fluid flow from a main flow rate control portion to a pilot operation portion, so that a flow rate in the fixed restriction connecting spaces in opposite sides of the plunger becomes zero and pressures in the spaces becomes substantially equal to each other and thus the plunger blocks a communication between an inlet port and an outlet port by means of the spring thereof. When a certain electric current is supplied to the solenoid, the latter produces a solenoid force corresponding to an amount of the input current. Therefore, the pilot spool is pushed by the push rod and moved against the spring force to open the poppet portion, upon which a portion of the fluid flowing through the inlet passage passes, as a pilot fluid, through the restriction passage connecting the both sides of the plunger and is reduced in pressure in the variable orifice of the pilot operation portion. The pilot fluid whose pressure is reduced flows through the poppet portion, the spring chamber, the restriction passage and the drain passage to the tank, causing pressure differences across the respective restriction passages of the plunger and the pilot spool to be produced. In the pilot operation portion, the opening of the variable orifice is regulated, against the solenoid force, by the pushing force of the pilot spool due to the pressure difference and the spring force urging the poppet portion so that a pilot flow rate corresponding the solenoid force is maintained. On the other hand, the pressure difference in the restriction passage connected across the plunger which corresponds to the pilot flow rate shifts the plunger to a position in which the pushing force of the plunger due to the pressure difference is balanced out by the force of the spring biasing the plunger. Therefore, the flow rate of the fluid flowing from the inlet passage to the outlet passage becomes substantially in proportion to the solenoid force.

DETAILED DESCRIPTION OF PREFERRED EMBODIMENTS

Figure 1:
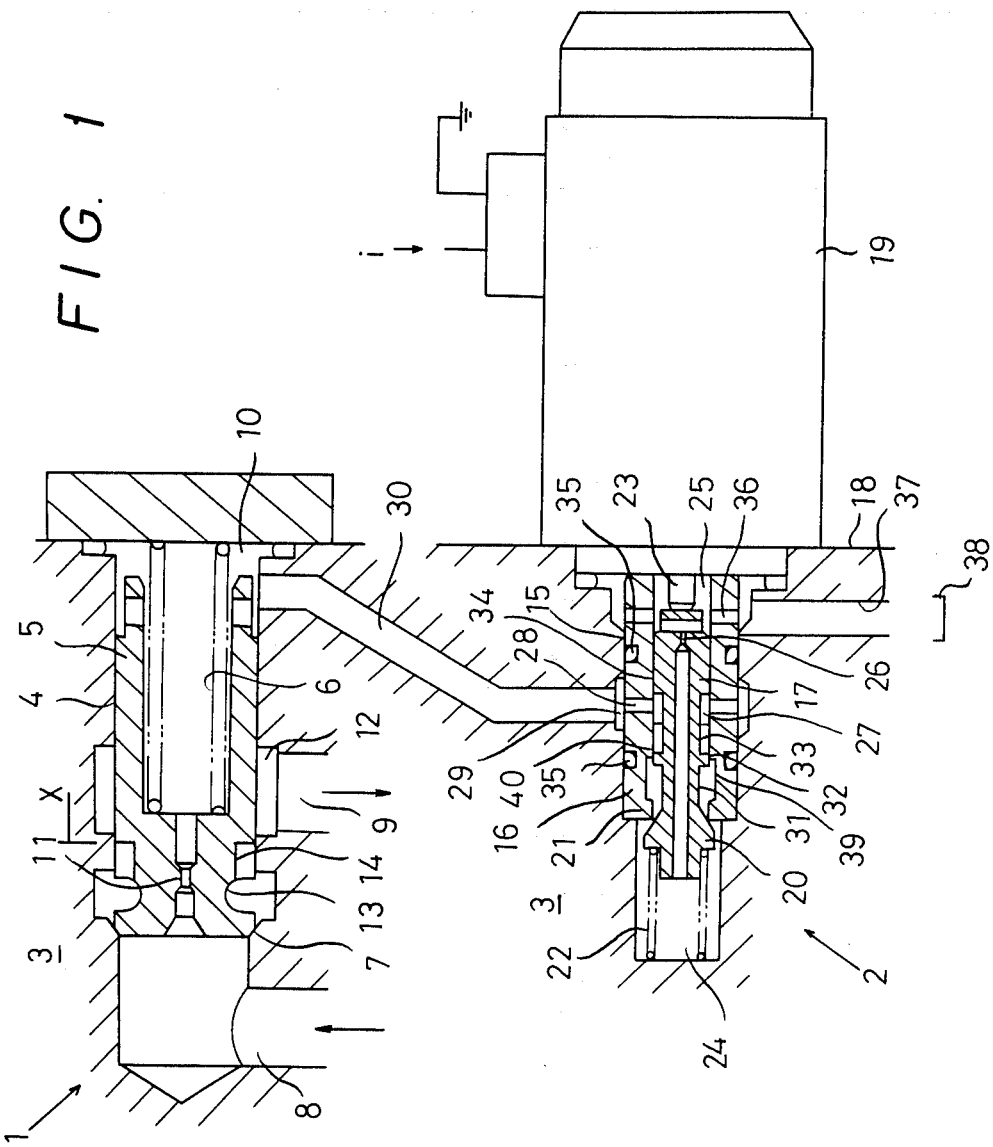
FIG. 1 is an oil pressure circuit according to an embodiment of the present invention.

In FIG. 1, an electromagnetic control valve according to the present invention is composed of a main flow control portion 1 and a pilot operation portion 2. The main flow control portion 1 comprises a valve body 3 formed with a valve bore 4, a plunger 5 inserted into the valve bore 4 slidably therealong, a spring 6 biasing the plunger 5 toward a valve seat 7 formed in a front end portion of the valve bore 4 to block a communication passage between an inlet port 8 and an outlet port 9. The plunger 5 has a restriction passage 11 which communicates a spring chamber 10, which is formed in a rear portion of the plunger 5, with the inlet port 8. An annular groove 12 is formed in a portion of an inner surface of the valve bore 4 in which the outlet port 9 is opened. An annular groove 13 and a recessed portion 14 connected to the groove 13 are formed in a portion of the plunger 5 between the valve seat 7 thereof and a portion thereof corresponding in position to the annular groove 12. The recessed portion 14 functions to provide a suitable sealing area between the annular groove 12 and the recessed portion 14 when the valve is closed.

The pilot operation portion 2 comprises a sleeve 16 inserted into a valve bore 15 formed in the valve body 3 and fixedly secured thereto, a pilot spool 17 inserted slidably into a hole of the sleeve 16 and a proportion solenoid 19 mounted, coaxially with the pilot spool 17, on an outer side surface 18 of the valve body 3. The pilot spool 17 is formed in an end thereof opposite to the proportion solenoid 19, a poppet portion 20 which is urged by a spring 22 toward a valve seat 21 formed in a rear end of the sleeve 16 and having the same diameter as that of the hole of the sleeve 16. A front end of the pilot spool 17 is faced to a push rod 23 of the proportion solenoid 19 in a deenergized state with a slight gap therebetween when the poppet portion 20 is in contact with the valve seat 21.

A restriction passage 26 is provided in the pilot spool 17. The restriction passage 26 connects a spring chamber 24 of the poppet portion 20 to a chamber 25 in which the push rod 23 of the proportion solenoid 19 is disposed. An annular groove 27 is formed on a periphery of a middle portion of the pilot spool 17 so that it is communicated with the spring chamber 10 of the main flow control portion 1 through a through-hole 28 of the sleeve 16 and an annular groove 29 and a pilot passage 30 formed in the valve body 3. A land portion 32 is formed on an area of the sleeve 17 defined between the annular groove 27 and an annular recess 31 thereof formed in the side of the poppet portion 20. The land portion 32 functions, together with a plurality of recesses 33 connected to the annular groove 27, to block a communication between an annular groove 39 formed in the sleeve 16 and the annular groove 27 with a small sealing area defined between the groove 39 and end portions of the recesses 33 and to substantially eliminate a leakage of fluid pressure from the annular groove 27 by means of a large land portion 34 formed between the chamber 25 and the groove 27. The chamber 25 is communicated with a tank 38 through a through-hole 36 of the sleeve 16 and a drain passage 37 formed in the valve body 3.

A pair of O-rings 35 are provided in both sides of the through-hole 28 of the sleeve 16.

In operation, when an input current i to the proportion solenoid 19 is zero, the poppet portion 20 of the pilot spool 17 is in contact with the valve seat 21, so that the communication between the annular groove 39 and the spring chamber 24 is blocked, the communication between the groove 39 and the recesses 33 is blocked by the sealing area provided by the land 32 and the communication between the annular groove 27 and the chamber 25 is blocked by the land 34. Therefore, there is substantially no fluid leakage from the annular groove 27 to the drain passage 37. Consequently, pressures in both sides of the plunger 5 becomes substantially equal to each other and thus the plunger 5 abuts against the valve seat 7 by the action of the spring 6 to block the communication between the inlet port 8 and the outlet port 9. On the other hand, the pressure in a region of the pilot operation portion 2 including the spring chamber 24 and a downstream region thereof is lower.

In the neutral state as mentioned above, when the input current i is supplied to the proportion solenoid 19, the latter provides a force corresponding to a valve of the supplied current by which the push rod 23 pushes the pilot spool 17 leftwardly against the spring 22, and the poppet portion 20 is opened to communicate the spring chamber 24 with the annular groove 39 and to communicate the groove 39 with the annular groove 27 through a variable orifice 40 formed by the groove 39 and the recesses 33. Therefore, a portion of the fluid in the inlet port 8 passes, as the pilot fluid, through the restriction passage 11, the spring chamber 10, the pilot passage 30, the annular groove 29, the through-hole 28, the annular groove 27 and the recesses 33 and, after its pressure is reduced in the variable orifice 40, passes through the groove 39, the spring chamber, the restriction passage 26, the chamber 25, the through-hole 36 and the drain passage 37 to the tank 38, to thereby produce pressure differences across the restriction passage 11 and across the restriction passage 26, respectively.

Figure 2:
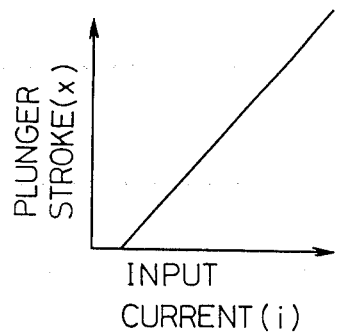
FIG. 2 is a graph showing a relation of an input electric current to a proportion solenoid to a plunger stroke.
Figure 3:
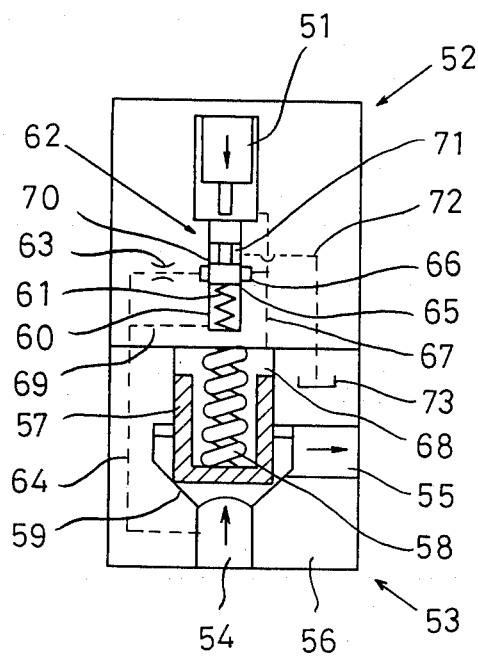
FIG. 3 is an oil pressure circuit of a conventional valve.

In the pilot operation portion 2, a pushing force produced in the pilot spool 17 by the pressure difference across the restriction passage 26 and the force of the spring 22 act against the force due to the input current to the solenoid to regulates the opening of the variable orifice 40 to thereby regulate the pilot flow rate to a value correspondingly to the solenoid force. On the other hand, the pressure difference across the restriction passage 11 of the plunger 5 which corresponds to the pilot flow rate produces a force pushing the plunger 5 against the force of the spring 6 to a position in which the both forces are balanced. Therefore, the flow rate of fluid flowing from the inlet port 8 to the outlet port 9 becomes substantially in proportion to the force produced by the input current supplied to the solenoid. Since the pushing force produced by the proportion solenoid 19 is substantially in proportion to the input current i as mentioned above, the amount x of movement of the plunger 5 is substantially proportional to the input current i as shown in FIG. 2.

It should be noted that although the restriction passages 11 and 26 across the plunger 5 and the pilot spool 17, are formed in the plunger 5 and the pilot spool 17 themselves, respectively, it may be possible to form these passages in the valve body 3.

As described hereinbefore, according to the present invention, the proportion solenoid does not require the pilot pressure and the main flow control portion is connected through the single pilot passage to the pilot operation portion to make the flow control in substantially proportion to the input current. Therefore, it is not necessary to constitute the proportion solenoid water-tight and pressure durable, causing the solenoid to be inexpensive and compact. Other components than the proportion solenoid can be also simplified in structure and, therefore, the control valve itself can be minimized in size and in cost according to the present invention. Further, since, in the present invention, the leakage of pilot fluid in the neutral state is eliminated by the provisions of the poppet portion in one end portion of the pilot spool and the large sealing areas in the other end portion thereof, the present control valve can be used in a circuit for holding a load in the neutral state, such as a load suspending circuit for a load lifting apparatus.

What is claimed is:

1. A proportional flow control valve including a main flow control portion having a plunger slidably inserted into a valve body, said plunger being biased in one direction by a spring acting on one end thereof and a pressure of a chamber housing said spring and responsive to a pressure of an inlet port of said valve body acting on the other end thereof against said biasing force to regulate an opening of a passage from said inlet port to an outlet port of said valve body, and a restriction passage formed across said plunger, a pilot operation portion having a proportion solenoid fixedly secured to said valve body for producing a pushing force acting on a push rod, said pushing force being proportional to an input current to said solenoid and a pilot spool slidably inserted into said valve body and biased in one direction by a spring acting on one end thereof, the other end being urged to said push rod by said spring biasing, said pilot operation portion forming a variable orifice whose opening depends upon a deviation of said pilot spool, a pilot passage connecting a space in the spring side of said plunger to one side of said opening of said variable orifice and a drain passage connecting the other side of said opening of said variable orifice to a drain, in which a flow rate of fluid flowing said restriction passage and hence a pressure difference across said restriction passage is varied by varying said input current, to vary a position of said plunger to thereby control the flow rate, wherein said pilot spool is slidably inserted into a sleeve inserted into and secured to a valve bore of said valve body and said one end of said pilot spool is formed with a poppet portion which is able to contact with a valve seat formed in one end of said sleeve, a restriction passage is connected across said pilot spool, said drain passage is provided between a chamber in which said push rod is arranged and said drain, said poppet portion is in intimate contact with said valve seat when a pushing force of said proportion solenoid is zero, said pilot passage is connected through said variable orifice and said poppet portion to a spring chamber when said pilot spool is pushed by said push rod, and said pilot spool is formed, in a region between an annular groove formed thereon and connected to said pilot passage and a chamber connected to said drain passage, with a long land which is in contact with an inner surface of said sleeve.

* * * * *